United States Patent
Otake

(10) Patent No.: US 10,984,249 B2
(45) Date of Patent: Apr. 20, 2021

(54) INFORMATION PROCESSING APPARATUS, SYSTEM, CONTROL METHOD FOR INFORMATION PROCESSING APPARATUS, AND NON-TRANSITORY COMPUTER READABLE STORAGE MEDIUM

(71) Applicant: CANON KABUSHIKI KAISHA, Tokyo (JP)

(72) Inventor: Ritsuko Otake, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 16/255,139

(22) Filed: Jan. 23, 2019

(65) Prior Publication Data
US 2019/0236377 A1    Aug. 1, 2019

(30) Foreign Application Priority Data
Jan. 31, 2018   (JP) .............................. JP2018-015503

(51) Int. Cl.
*G06K 9/00*    (2006.01)

(52) U.S. Cl.
CPC ..... *G06K 9/00771* (2013.01); *G06K 9/00335* (2013.01)

(58) Field of Classification Search
CPC .... G06Q 30/0631; G06Q 30/00; G06Q 10/00; G06Q 10/08355; G06Q 10/087; G06Q 30/0224; G03G 15/5016; G03G 15/502; G03G 15/5075; G03G 2215/00109; H04M 3/5116; H04M 1/7253; H04M 1/72541; H04M 2203/256; H04M 2203/257; H04M 2203/258; H04M 2242/04; H04M 2242/30; H04M 2250/12; H04M 3/436
See application file for complete search history.

(56) References Cited

U.S. PATENT DOCUMENTS

| | | | |
|---|---|---|---|
| 9,798,385 B1 * | 10/2017 | Das ...................... | A61B 5/4824 |
| 2016/0210829 A1 * | 7/2016 | Uchida ............ | G08B 13/19645 |
| 2017/0032304 A1 * | 2/2017 | Charpentier ......... | G06Q 20/209 |
| 2017/0278162 A1 * | 9/2017 | Yamaura ............ | G06K 9/00302 |

FOREIGN PATENT DOCUMENTS

| | | | |
|---|---|---|---|
| JP | 2004310197 A | 11/2004 | |
| JP | 2005250745 A | 9/2005 | |
| JP | 2009259111 A | 11/2009 | |
| JP | 2012032910 A | 2/2012 | |
| JP | 2017059945 A | 3/2017 | |

* cited by examiner

*Primary Examiner* — Quan M Hua
(74) *Attorney, Agent, or Firm* — Carter, DeLuca & Farrell LLP

(57) ABSTRACT

An information processing apparatus comprising a detection unit configured to analyze an input image and detect a person included in the image, a person determination unit configured to determine whether the detected person is a person registered in advance, an action determination unit configured to determine whether a person determined by the person determination unit not to be the person registered in advance has performed a first action for requesting support, and an output unit configured to output to an external device a notification about a first person determined by the action determination unit to have performed the first action, wherein the detection unit executes further image analysis associated with the first person determined by the action determination unit to have performed the first action.

16 Claims, 8 Drawing Sheets

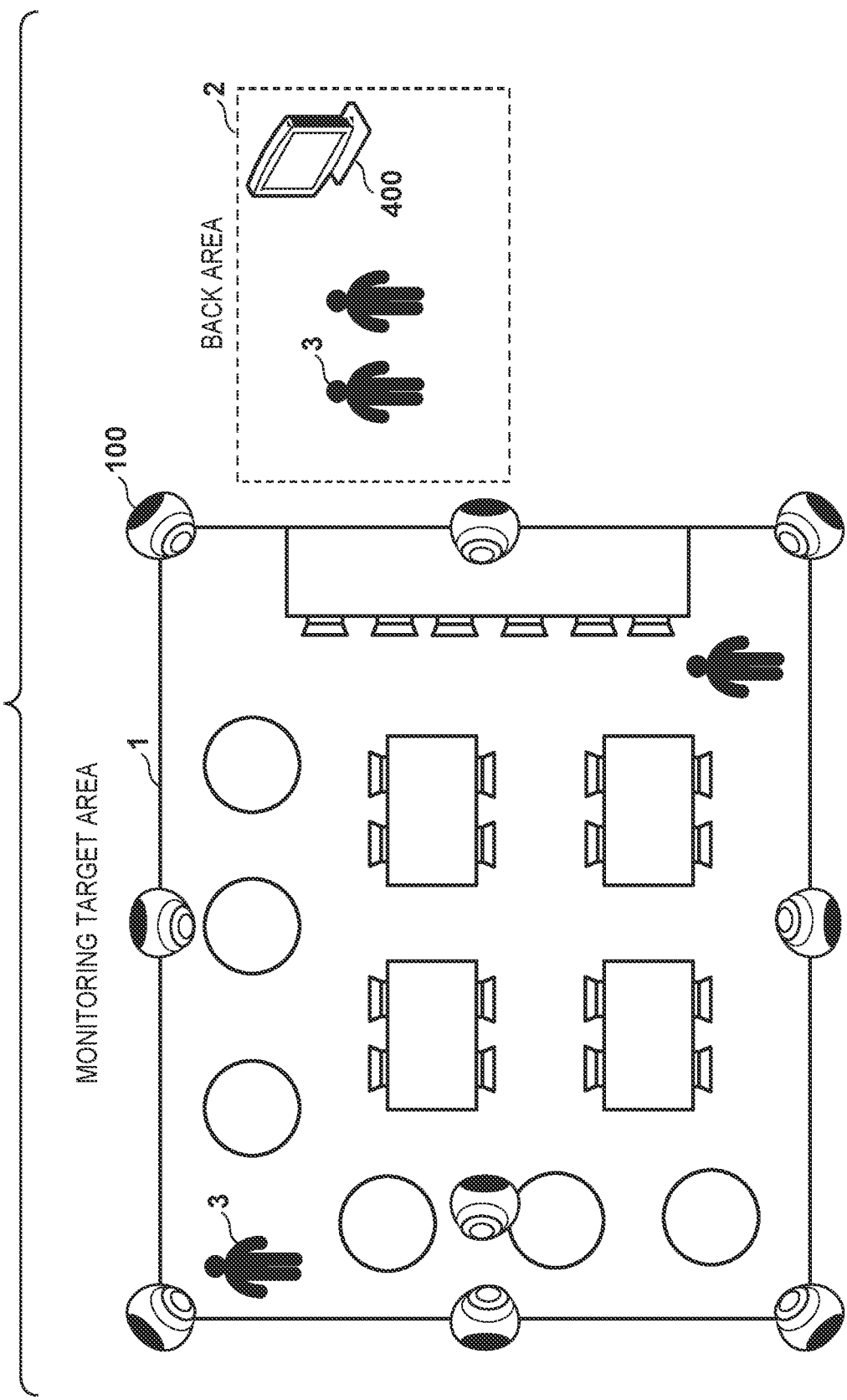

INFORMATION PROCESSING APPARATUS, SYSTEM, CONTROL METHOD FOR INFORMATION PROCESSING APPARATUS, AND NON-TRANSITORY COMPUTER READABLE STORAGE MEDIUM

BACKGROUND OF THE INVENTION

Field of the Invention

The present disclosure relates to an information processing apparatus, a system, a control method for the information processing apparatus, and a non-transitory computer readable storage medium.

Description of the Related Art

There is known a technique of analyzing an image captured by a monitoring camera, watching a person captured in the image, and monitoring his/her behavior. Japanese Patent Laid-Open No. 2012-32910 discloses a technique of watching a person present in a predetermined area, if the person in the watched state takes a predetermined behavior, reporting it, and if the person leaves the predetermined area, canceling the watched state.

Processing of analyzing a behavior of a person in an image, which is disclosed in Japanese Patent Laid-Open No. 2012-32910, continues while the watched person is detected in the image (until he/she exits from the predetermined area or the image capturing range). However, even when a person is detected in an image, if the analysis processing continues without exception for even a person who need not be watched or a person to whom the necessity of watching is canceled, the processing performance drops.

SUMMARY OF THE INVENTION

The present disclosure provides a technique of distinguishing for a person detected in an image between a person whose behavior should be analyzed and a person who can be excluded from targets, reducing unnecessary processing, and improving the processing efficiency.

One aspect of exemplary embodiments relates to an information processing apparatus comprising, a detection unit configured to analyze an input image and detect a person included in the image, a person determination unit configured to determine whether the detected person is a person registered in advance, an action determination unit configured to determine whether a person determined by the person determination unit not to be the person registered in advance has performed a first action for requesting support, and an output unit configured to output to an external device a notification about a first person determined by the action determination unit to have performed the first action, wherein the detection unit executes further image analysis associated with the first person determined by the action determination unit to have performed the first action.

Further features of the invention will become apparent from the following description of exemplary embodiments (with reference to the attached drawings).

BRIEF DESCRIPTION OF THE DRAWINGS

FIG. 1B is a view showing an example of a facility to which the exemplary embodiment is applicable;

DESCRIPTION OF THE EMBODIMENTS

Exemplary embodiments will now be described with reference to the accompanying drawings. Note that arrangements described in the following embodiments are merely examples and the invention is not limited to illustrated arrangements.

First Embodiment

Figure 1A:
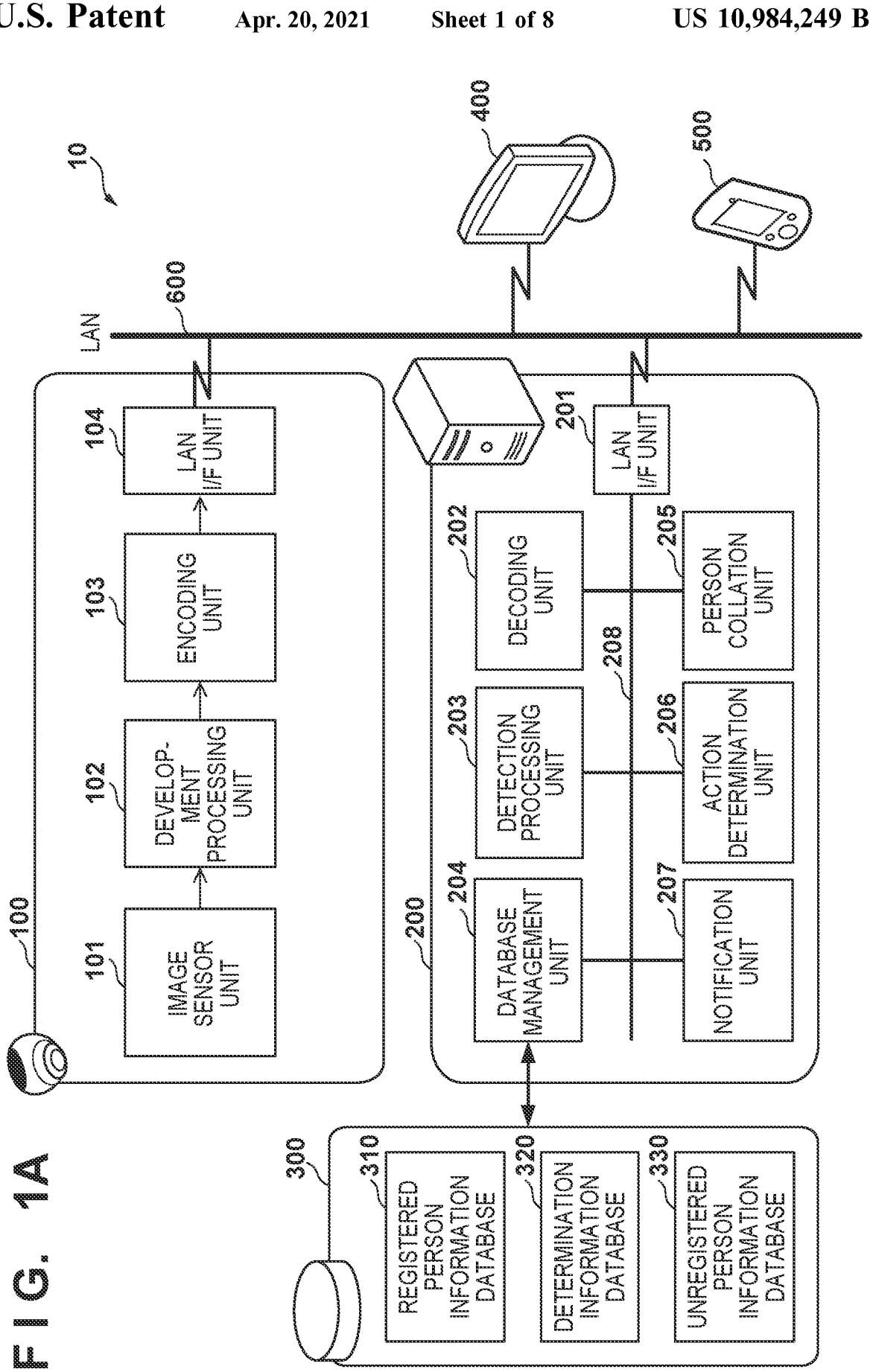
FIG. 1A is a block diagram showing an example of the arrangement of a system 10 according to an exemplary embodiment.

FIG. 1A is a block diagram showing an example of the arrangement of a system 10 according to an exemplary embodiment. The system 10 is formed by a network camera 100, an information processing apparatus 200, a database apparatus 300, an information display device 400, and an input terminal 500, all of which are interconnected by a LAN 600 as a network line. The constituent elements of the system 10 shown in FIG. 1A are merely examples, and other constituent elements may be added. Each constituent element will be described below.

The network camera 100 can be configured to include an image sensor unit 101, a development processing unit 102, an encoding unit 103, and a LAN interface (I/F) unit 104. The image sensor unit 101 includes an imaging element such as a CMOS element that photoelectrically converts an optical image formed on an imaging plane and outputs an analog image signal, and an A/D converter that converts an analog image signal into a digital image signal. The development processing unit 102 executes predetermined development processing for the digital image signal output from the image sensor unit 101. The development processing can include, for example, DeBayer processing, white balance processing, tone conversion processing, edge enhancement correction processing, flaw correction, noise removal, enlargement/reduction processing, and color conversion to the YCbCr format.

The encoding unit 103 compresses/encodes the digital image signal output from the development processing unit 102 to generate image data to be provided to the information processing apparatus 200. The generated image data includes the identification information (camera ID) of the network camera 100, information (position information) of an installation place, and shooting time information. The encoding unit 103 also sets a frame rate at the time of generation of image data. An image compression method for distribution can comply with a standard such as H.264, H.265, MJPEG, or JPEG. Image data in an arbitrary format including the MP4 or AVI format may be generated.

The LAN I/F unit 104 serves as a communication interface for transmitting, to the information processing apparatus 200 via the LAN 600, the image data output from the encoding unit 103. The LAN I/F unit 104 adjusts data exchange with a communication partner using, for example, a network file system such as NFS or CIFS or a network communication protocol such as UDP or TCP.

Next, the arrangement of the information processing apparatus 200 will be described. The information processing apparatus 200 can be configured to include a LAN interface (I/F) unit 201, a decoding unit 202, a detection processing unit 203, a database management unit 204, a person collation unit 205, an action determination unit 206, and a notification unit (output unit) 207, all of which are connected to each other by a system bus 208.

The LAN I/F unit 201 communicates with the network camera 100, the information display device 400, the input terminal 500, the external Internet, and the like via the LAN 600. The decoding unit 202 reconstructs a digital image signal by decompressing and decoding the image data acquired from the network camera 100 via the LAN 600. The decoded digital image signal is output to the detection processing unit 203 that performs image analysis processing according to this embodiment.

The detection processing unit 203 performs person detection processing of analyzing image data and detecting each person included in the image. The database management unit 204 manages registration information in each of databases 310 to 330 of the database apparatus 300. For example, the database management unit 204 performs processing of updating the registration information in each database, extracting the registration information from each database, and providing the information to each processing unit, as needed. The person collation unit 205 performs person collation processing based on person determination (collation) of whether a person detected by the detection processing unit 203 is a specific person registered in the registered person information database 310.

The action determination unit 206 determines whether a person determined not to be the specific person by collation in the person collation unit 205 has performed a predetermined action for requesting support. Also, the action determination unit 206 determines whether a person determined to be the specific person has performed a specific action. Details of the action determination processing will be described later. The notification unit 207 notifies (outputs) the information display device 400 of information based on the processing result in the action determination unit 206. Details of the notification processing will be described later with reference to FIGS. 6A and 6B.

The database apparatus 300 is a database in which information to be referred to by the information processing apparatus 200 in executing processing according to this embodiment is registered, and can include the registered person information database 310, the determination information database 320, and the unregistered person information database 330. Although the database apparatus 300 is connected to the information processing apparatus 200, it may include a network interface and be connected to the LAN 600. In this case, the information processing apparatus 200 and the database apparatus 300 communicate with each other via the LAN I/F unit 201.

The registered person information database 310 is a database in which an employee (staff) or the like in a facility applied with the system 10 is registered in advance and information of the person to be identified is registered. The system 10 can be applied to a facility such as a restaurant. In this case, the restaurant staff (server) working in the restaurant serves as a registered person and information about the person is registered. When image data is analyzed, this information enables determination of whether a person captured in an image is the restaurant staff serving as the registered person. The information can include, for example, a face image or a uniform image. The registered information may be not an image but information of a feature amount extracted from a face image or the like.

Information usable when the action determination unit 206 analyzes an action of a person, such as a template image, is registered in advance in the determination information database 320. The unregistered person information database 330 is a database for holding information about a person determined to be a watched person as a result of action analysis by the action determination unit 206.

The information display device 400 is a device that displays notification information transmitted from the information processing apparatus 200, and can be implemented by, for example, a personal computer (PC), a tablet terminal, or a smartphone terminal. The information display device 400 may be connected to the LAN 600 via a wire or wirelessly. Wireless connection can comply with, for example, the IEEE802.11 wireless LAN standard. In this embodiment to be further described below, the information display device 400 is assumed to be a personal computer installed in the back area of the restaurant applied with the system 10. The restaurant staff can check a notification from the information processing apparatus 200 on the information display device 400 in the back area and quickly provide a desired service to a visiting customer.

The input terminal 500 is an input device for inputting an order accepted from the customer by the restaurant staff, and can be implemented by a dedicated input terminal, a general-purpose tablet terminal, a smartphone terminal, or the like. The input terminal 500 can be connected wirelessly to the LAN 600. In this case, the wireless connection can comply with the IEEE802.11 wireless LAN standard. The input terminal 500 can notify the information processing apparatus 200 that the restaurant staff has input the order accepted from the customer.

In the arrangement of the system 10 shown in FIG. 1A, the number of network cameras 100 can be an arbitrary number of one or more and is not limited. Each of the information processing apparatus 200, the database apparatus 300, and the information display device 400 is implemented by a single apparatus, but each function may be implemented by a plurality of apparatuses in cooperation with each other. The detection processing unit 203 is provided on the information processing apparatus 200 side in FIG. 1A, but may be provided on the network camera 100 side. In this case, information of each person detected by the detection processing unit 203 is transmitted from the network camera 100 to the information processing apparatus 200 side.

The system 10 according to this embodiment can be applied to a restaurant as shown in FIG. 1B. The restaurant is roughly partitioned into a monitoring target area 1 and a back area 2. The monitoring target area 1 is an area where customers visiting the restaurant stay, and person detection processing to be described later is performed for customers staying in this area. The back area 2 is an area where restaurant staff 3 stands by. The information display device 400 is installed in the back area 2, and the restaurant staff 3 can specify a customer requiring support and give necessary support in accordance with a notification by the information display device 400.

The network camera 100 is arranged in the monitoring target area 1 and shoots the state of the monitoring target area 1. The number of network cameras 100 and their arrangement locations are not particularly limited as long as they are arranged to be able to shoot customers staying in the monitoring target area 1. FIG. 1B shows a case in which a plurality of network cameras 100 shoot. The arrangement and number of the network cameras 100 can be changed arbitrarily in accordance with the layout of the restaurant. The network cameras 100 may shoot a moving image of the monitoring target area 1 or shoot still images at a predetermined time interval.

Although FIG. 1B shows a case in which the monitoring target area 1 and the back area 2 are partitioned physically definitely, the two regions may not be partitioned physically. In this case, for example, a region where customers stay can be set as the monitoring target area and the remaining region can be set as the back area 2.

Figure 2:
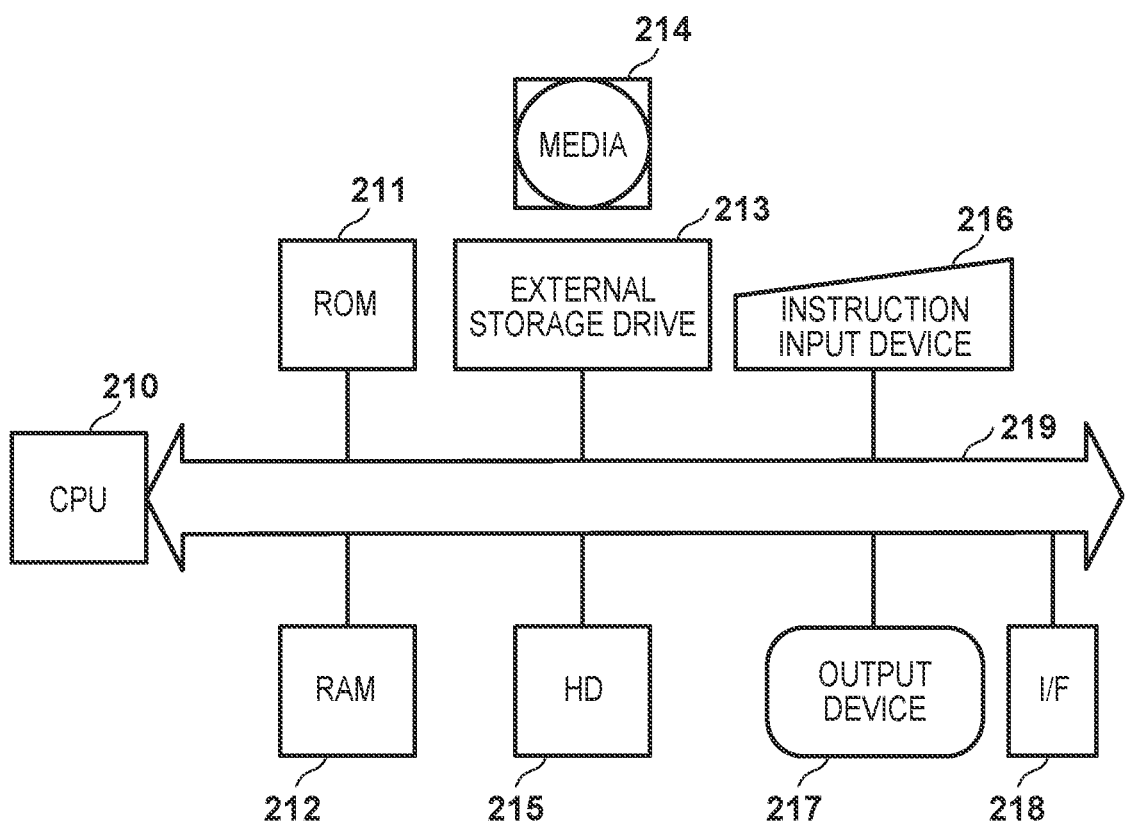
FIG. 2 is a block diagram showing an example of the hardware arrangement of an information processing apparatus 200 according to the exemplary embodiment.

The schematic arrangement of the information processing apparatus 200 forming the system 10 according to this embodiment will be described next. FIG. 2 is a block diagram showing an example of the hardware arrangement of the information processing apparatus 200. The above-described database apparatus 300, information display device 400, and input terminal 500 as information processing apparatuses may have the similar or same hardware arrangement.

Referring to FIG. 2, a CPU 210 performs control to execute an application program, an operating system (OS), a control program, or the like stored in a hard disk device (to be referred to as an HD hereinafter) 215 and temporarily store, in a RAM 212, information, files, and the like necessary to execute a program. The CPU 210 also executes processing according to this embodiment based on image data provided from the network camera 100 and stored in the RAM 212, and information acquired from the database apparatus 300. Furthermore, the CPU 210 controls data transmission/reception to/from the external information display device 400 via an interface (I/F) 218. Note that processes in FIGS. 3A, 3B, and 5 to be described later are implemented when the CPU 210 controls the overall apparatus by executing corresponding processing programs.

A ROM 211 stores various data such as an application program for executing predetermined processing in addition to a basic I/O program. The RAM 212 temporarily stores various data, and functions as a main memory, a work area, or the like for the CPU 210. The RAM 212 also temporarily stores the information received from the network camera 100 or the database apparatus 300.

An external storage drive 213 is an external storage drive for implementing access to a recording medium, and can load a program and the like stored in a medium (recording medium) 214 into this computer system. Note that as the medium 214, for example, a floppy® disk (FD), CD-ROM, CD-R, CD-RW, PC card, DVD, Blu-ray®, IC memory card, MO, memory stick, or the like can be used.

In this embodiment, an HD (Hard Disk) functioning as a mass memory is used as the external storage device 215. The HD 215 stores application programs, an OS, control programs, related programs, and the like. Instead of the hard disk, a nonvolatile storage device such as a flash® memory may be used.

A keyboard and a pointing device (mouse or the like), a touch panel, or the like corresponds to an instruction input device 216. An output device 217 outputs a command input from the instruction input device 216, a response output of the information processing apparatus 200 to the command, or the like. The output device 217 can include a display, a loudspeaker, and a headphone terminal. A system bus 219 manages the flow of data in the information processing apparatus 200.

The interface (to be referred to as the I/F hereinafter) 218 has a role in mediating data exchange with an external device. More specifically, the I/F 218 can include a wireless communication module, and the module can include well-known circuit mechanisms including an antenna system, an RF transmitter/receiver, one or more amplifiers, a tuner, one or more oscillators, a digital signal processor, a CODEC chipset, a subscriber identification module card, and a memory. Furthermore, the I/F 218 can include a wired communication module for wired connection. The wired communication module allows communication with another device via one or more external ports. The I/F 218 can include various software components that process data. The external port is coupled to another device via Ethernet, USB, IEEE1394, or the like directly or indirectly through a network. Note that software for implementing the same function as that of each of the above apparatuses can be used in place of the hardware apparatus.

Figure 3A:
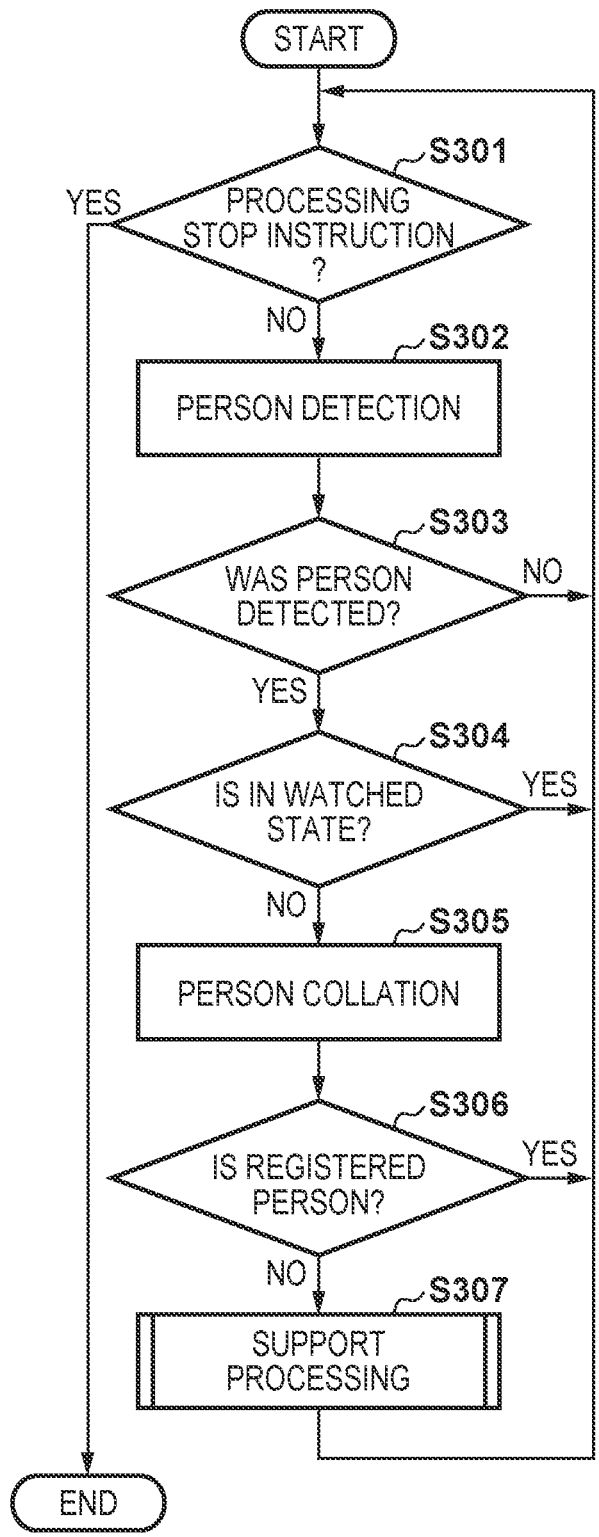
FIG. 3A is a flowchart showing an example of processing executed by the information processing apparatus 200 in the system 10 according to the exemplary embodiment.
Figure 3B:
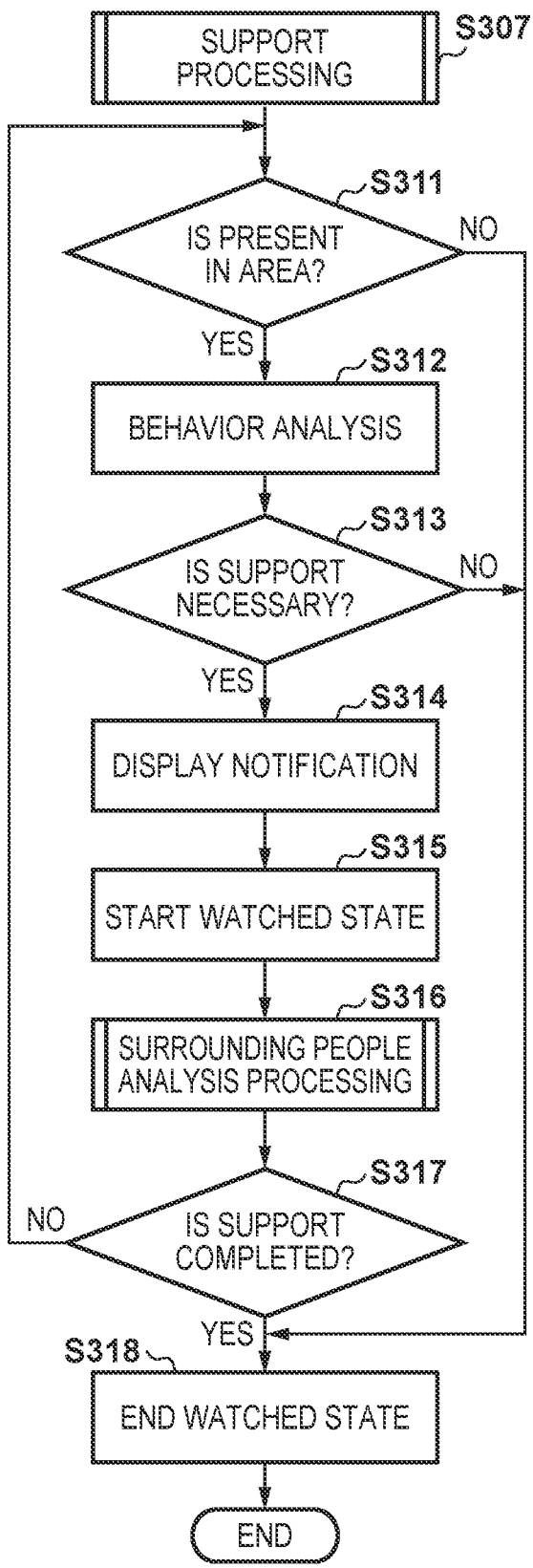
FIG. 3B is a flowchart showing an example of support processing executed by the information processing apparatus 200 in the system 10 according to the exemplary embodiment.

Details of processing according to the exemplary embodiment will be described below with reference to FIGS. 3A and 3B. This processing is implemented by executing a predetermined program by the CPU 210 to function as the detection processing unit 203, the person collation unit 205, the action determination unit 206, the notification unit 207, and the like. FIGS. 3A and 3B are flowcharts showing an example of processing executed by the information processing apparatus 200 according to the exemplary embodiment. FIG. 3A shows a flowchart showing the procedure of processing of analyzing image data received from the network camera 100 and determining whether to execute support processing for a person in the monitoring target area 1.

First, in step S301, the CPU 210 determines the presence/absence of a processing stop instruction. The processing in this embodiment is assumed to be executed continuously for image data input from the network camera 100. However, the processing may stop owing to an instruction from the user of the information processing apparatus 200, a system trouble, or the like. Immediately when a stop instruction is received, a series of processes ends. In this case, the processing executed by the CPU 210 functioning as the detection processing unit 203, the person collation unit 205, the action determination unit 206, the notification unit 207, and the like ends immediately. If there is no stop instruction, the process advances to step S302.

In step S302, the detection processing unit 203 analyzes image data and executes person detection processing in the monitoring target area 1. The range where the person detection processing is executed may be an entire region included in the image data or be limited to a partial region in the image data. In the case of a restaurant assumed in this embodiment, the person detection processing may be executed restrictively for the whole inside of the restaurant, the entrance, the floor region, or the like. The person detection processing is processing of detecting a person captured in shot image data of the monitoring target area 1 and, for example, a known method using a pattern matching technique is applicable.

Subsequently in step S303, the process branches based on the result of the person detection processing by the detection processing unit 203. If the detection processing unit 203 has not detected a person ("NO" in step S303), the process returns to step S301. If the detection processing unit 203 has detected a person ("YES" in step S303), the process shifts to step S304.

In step S304, the person collation unit 205 determines whether the person detected by the detection processing unit 203 (to be referred to as the "detected person" hereinafter) is a person in the watched state to be described later (to be referred to as a "watched person" hereinafter). The determination of whether the detected person is a watched person is performed by referring to information registered in the unregistered person information database 330. If the detected person has been registered as a watched person ("YES" in step S304), subsequent processing has been executed for this person, so the process returns to step S301, and the detection processing unit 203 detects another person in the image data. If the detected person is not in the watched state ("NO" in step S304), the process advances to step S305.

In step S305, the person collation unit 205 executes person collation processing. The person collation processing is processing of collating the detected person with person information registered in advance in the registered person information database 310. In this embodiment, information of the server of the restaurant and the like is registered in advance in the registered person information database 310. The person collation unit 205 determines whether the detected person is one of people registered in the registered person information database 310. If the detected person is determined to be a registered person ("YES" in step S306), this person is not a target to receive support, so the process returns to step S301. If the detected person is determined not to be a registered person ("NO" in step S306), the process advances to step S307.

The person collation processing in step S305 can adopt, for example, a method of registering the face photo of each member of the restaurant staff in the registered person information database 310, and utilizing the similarity between a feature amount calculated from the face photo and a feature amount calculated from the face region of a detected person obtained from video. When no individual need be specified, for example, a common feature (for example, a uniform) of employees of the restaurant can also be registered and collated as information. It is also possible that a registered person (=a person capable of support) wears a signal generator configured to generate a predetermined signal (for example, a beacon signal), a corresponding signal receiver is installed in the area, and whether the detected person is a registered person is determined using the result of signal exchange. The signal generator may use the input terminal 500. Any of various other methods may be applied.

In step S307, support processing is executed. Details of the support processing will be explained with reference to FIG. 3B. At this point, the detected person is confirmed not to be a registered person and is subjected to determination of whether the person requires support. This person will be referred to as a "determination target person". Although the process advances to step S307 for the determination target person, the process returns to step S301 while the support processing continues, and the detection processing unit 203 starts the next person search.

FIG. 3B is a flowchart for explaining the procedure of the support processing in step S307. In step S311, the action determination unit 206 determines whether the determination target person is present (stays) in the area. If the determination target person is not present in the area ("NO" in step S311), the support processing ends. If the determination target person is present ("YES" in step S311), the process advances to step S312.

In the case of a restaurant assumed in this embodiment, the determination target person is a customer visiting the restaurant. In the determination processing of step S311, if a customer corresponding to the determination target person stays in the monitoring target area 1, the process continues. If the customer exits from the monitoring target area 1, the process ends. The monitoring target area 1 may be a range where the person detection processing has been performed in step S302. In the case of a restaurant, the monitoring target area 1 can be a range limited to the whole inside of the restaurant, the floor region, the entrance, or the like. If the determination target person is not present in the monitoring target area 1 and has been registered as a watched person at this point, the support processing ends through watched state end processing in step S318 to be described later.

In step S312, the action determination unit 206 performs behavior analysis processing for the determination target person and determines whether the determination target person requires support. In this behavior analysis processing, the behavior of the determination target person is analyzed to determine whether the determination target person performs a predetermined behavior or action for requesting support. The predetermined behavior or action includes a behavior or action that can be supposed to require support, such as a gesture of calling someone or a gesture of searching for something. The behavior analysis processing includes even processing of determining whether the determination target person is present in the monitoring target area 1. If the determination target person leaves the area, it is determined that support is unnecessary.

In step S313, the process branches in accordance with the necessity/unnecessity of support for the determination target person based on the analysis result in step S312. If the action determination unit 206 determines that support is unnecessary ("NO" in step S313), the support processing ends. At this time, if the determination target person has already been in the watched state, the support processing ends through watched state end processing in step S318 to be described later. If the action determination unit 206 determines that support is necessary ("YES" in step S313), the process advances to step S314.

If the action determination unit 206 determines in step S313 that support is necessary, the notification unit 207 generates notification information to be displayed on the information display device 400 to represent the person requiring support, and transmits the notification information to the information display device 400 via the LAN I/F unit

201 in step S314. In the back area 2, the restaurant staff can confirm the notification information on the information display device 400 and go for support to the person represented to require support. The display contents can be, for example, an alert screen for attracting attention of the restaurant staff, and an image representing the person requiring support can be superimposed on video shot by the network camera 100. Alternatively, the current location of the person requiring support may be indicated in the layout of the inside of the restaurant. The staff may be notified by sound output that a new person requiring support has been found. Examples of the display on the information display device 400 will be described later with reference to FIGS. 6A and 6B. After that, the process advances to step S315.

In step S315, if the determination target person has not been in the watched state, he/she is registered as a watched person. For example, information for specifying the person (for example, a feature amount calculated from the face image of the determination target person) is registered in the unregistered person information database 330. After the determination target person is registered as a watched person, even if this person moves in the restaurant, his/her behavior is tracked in the image data so as not to lose sight of the person till the end of the support processing. More specifically, surrounding person analysis in step S316 to be described later is executed continuously for the person determined to be the watched person in the processing from steps S302 to S304 executed for image data received from the network camera 100.

In step S316, the surrounding person analysis processing is executed. In this surrounding person analysis processing, the behavior of another person appearing around the watched person is analyzed. Although details of the surrounding person analysis processing will be described later, whether support for the watched person is completed is determined from this analysis result. In the case of a restaurant assumed in this embodiment, it can be determined whether the restaurant staff (surrounding person) has headed for support to the customer (watched person) requesting support of the restaurant staff and has actually given support.

In step S317, the process branches in accordance with whether support for the watched person is completed. If it is determined that support is completed ("YES" in step S317), the process advances to step S318. If it is determined that support is uncompleted ("NO" in step S317), the process returns to step S311 to repeat the above-described processing. In step S318, the database management unit 204 cancels the watched state by deleting the information registered as the watched person from the unregistered person information database 330, and the support processing ends. At this time, the notification unit 207 updates the notification information by erasing, from the notification information generated and transmitted in step S314, information about the person for whom it is determined that support is completed, and transmits the updated notification information to the information display device 400. As a result, the display on the information display device 400 is updated.

Figure 4A:
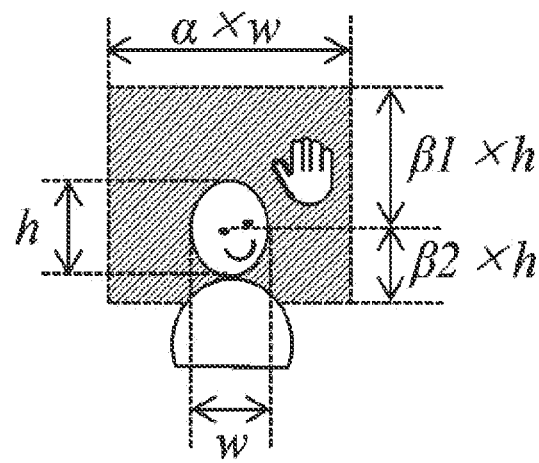
FIG. 4A is a view for explaining the positional relationship between the face and the hand in association with behavior analysis processing according to the exemplary embodiment.
Figure 4B:
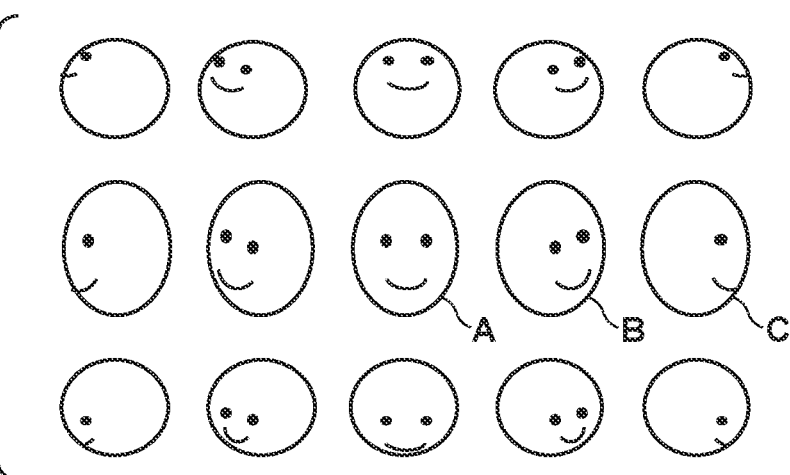
FIG. 4B is a view simply showing patterns of the face direction in association with behavior analysis processing according to the exemplary embodiment.
Figure 4C:
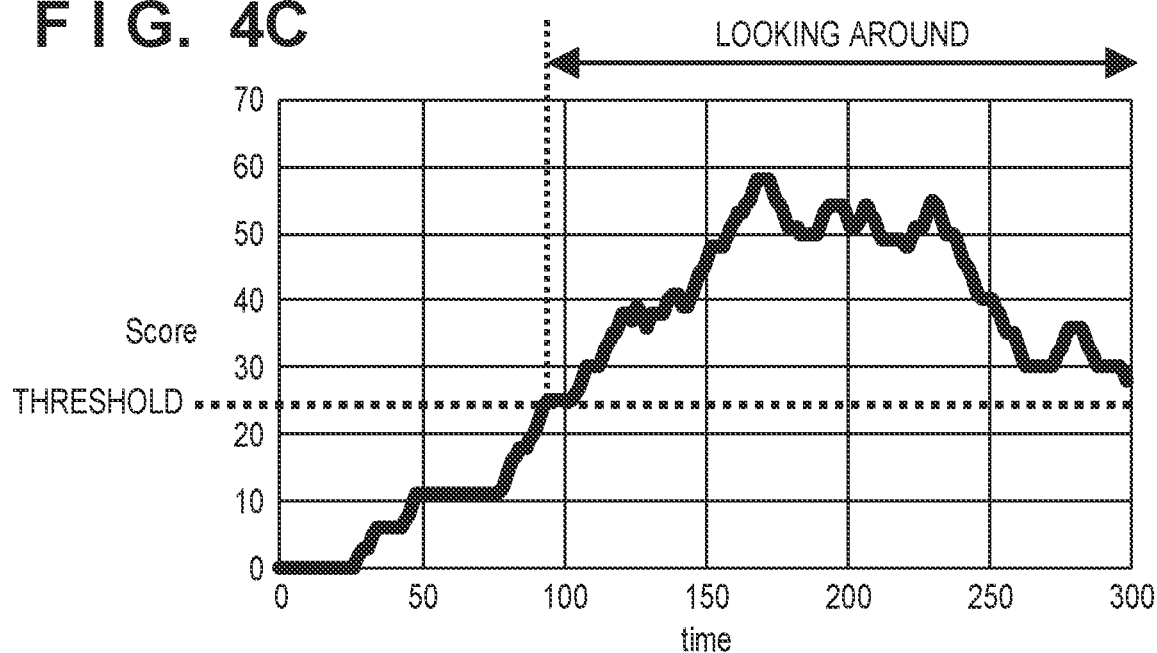
FIG. 4C is a graph showing an example of score variations based on the change amount of the face direction in association with behavior analysis processing according to the exemplary embodiment.

Next, an example of the behavior analysis processing in step S312 of FIG. 3B will be described with reference to FIGS. 4A to 4C. FIGS. 4A to 4C are views for explaining a method of detecting a show of hands considered to be a gesture of calling someone, and a method of detecting frequent changes of the face direction considered to be a gesture of searching for something.

First, an example of the method of detecting a show of hands that is a gesture of calling someone will be explained. FIG. 4A is a view for explaining the positional relationship between the face and the hand. The rough lateral size (w) and longitudinal size (h) of the face of a person and the center coordinates of the face on video are acquired from information obtained at the time of detecting the person. When the hand of the person is detected in a hatched range in FIG. 4A obtained from the acquired w and h using coefficients $\alpha$, $\beta 1$, and $\beta 2$, it is determined that the determination target person raises his/her hand.

Here, $\alpha$, $\beta 1$, and $\beta 2$ are coefficients that are variable depending on the specification environment and application purpose of the system, and designate a range considered to be the position of the hand when a person of a reference face raises his/her hand. The method of detecting the hand of a person can be a high-precision method such as a method (Japanese Patent Laid-Open No. 2017-59945) using well-known machine learning or a method (Japanese Patent Laid-Open No. 2009-259111) of detecting the hand using the outline of a body and a portion of the skin color. It is also possible to apply a simple method of calculating the average color of the center portion of the face region and detecting, as the hand of a person, a size region that falls within a predetermined color difference from the average color and has a predetermined ratio of the sizes (w and h) of the face.

Next, an example of the method of detecting a gesture of searching for someone will be explained. One of person's gestures of searching for something is a gesture of looking around. In this gesture, the face direction changes frequently. The method of detecting frequent changes of the face direction will be described with reference to FIGS. 4B and 4C.

FIG. 4B is a view simply showing patterns of the face direction. The face of the determination target person is collated with these patterns, and a direction corresponding to a pattern having the highest similarity is determined to be the face direction of the determination target person at that time. When the change amount of the face direction of the determination target person is large, it is detected that the determination target person is making a gesture of searching for something.

FIG. 4C is a graph showing an example of score variations based on the change amount of the face direction. When a score (ordinate of the graph) obtained by integrating change amounts within a predetermined time interval exceeds a predetermined threshold, it is determined that the determination target person is making a gesture of searching for something (an action of looking around). In the calculation of the score, for example, distances between the patterns in FIG. 4B are replaced with numerical values, and the integration of moving amounts between the patterns within the predetermined time interval is used as a reference. For descriptive convenience, patterns A, B, and C in FIG. 4B will be exemplified. For example, the moving amount is moving amount 1 when the face direction changes from the pattern A to the pattern B, and moving amount 2 when the face direction changes from the pattern A to the pattern C. When the face direction changes from the pattern A to the pattern B (moving amount 1), from the pattern B to the pattern C (moving amount 1), and from the pattern C to the pattern A (moving amount 2) within the predetermined time interval, the integrated value is 4. The score is incremented in accordance with the integrated value. When the integrated value is 0, that is, the face direction does not change within the predetermined time interval, the score is decremented.

FIG. 4C shows a temporal change of the score obtained in this manner. An integrated value serving as the base of an additional value of the score may be calculated by a calculation method considering the moving direction in addition to the moving amount between patterns. For example, the moving amount is 2 in both a change of A→B→C and a change of A→B→A, but the integrated value is set larger (for example, 1.5 times) for A→B→A in which the moving direction is reversed. This can implement score incrementation that makes it easier to catch the looking-around action of the determination target person.

Figure 5:
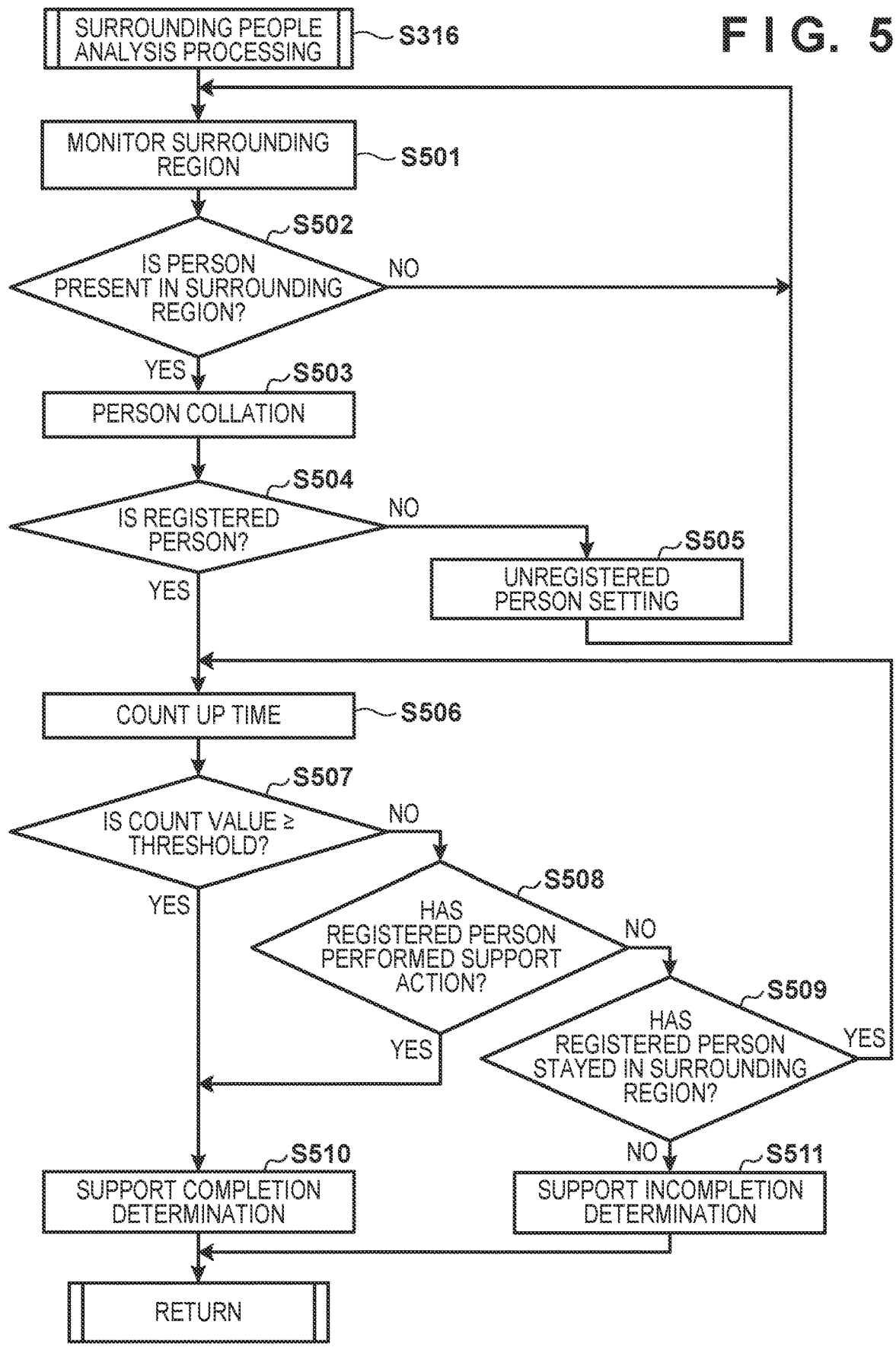
FIG. 5 is a flowchart showing an example of surrounding person analysis processing according to the exemplary embodiment.

Next, details of the surrounding person analysis processing in step S316 will be described with reference to FIG. 5. FIG. 5 is a flowchart showing an example of the surrounding person analysis processing. In the surrounding person analysis processing, whether support to a watched person is completed can be determined by analyzing the behavior of a person present in a predetermined region surrounding the watched person serving as a criterion.

In step S501, the detection processing unit 203 monitors whether a person other than a watched person is present in a region surrounding the watched person. The surrounding region is a region around the watched person in image data, and suffices to have a size enough to detect the presence of the restaurant staff when the restaurant staff tries to support the watched person. This processing can be executed by applying the same method as that in step S302 to the surrounding region. It is also possible that a person contained in image data is detected, and when it is detected that the person has come across the boundary of the surrounding region and has entered the surrounding region, it is determined that the person is present in the surrounding region. If the detection processing unit 203 detects the person in the surrounding region ("YES" in step S502), the process advances to step S503. If the person is not detected in the surrounding region ("NO" in step S502), the process returns to step S501 to continue monitoring.

In step S503, the person collation unit 205 determines whether the person whose presence is detected in the surrounding region is a registered person. This person collation processing can be executed similarly to the processing in step S305. Subsequently in step S504, the process branches based on the result in step S503. If the detected person is a registered person ("YES" in step S504), the process advances to step S506; if he/she is not a registered person ("NO" in step S504), to step S505.

In step S505, if the person detected in step S502 is determined not to be a registered person, the database management unit 204 registers person information of this person as an unregistered person in the unregistered person information database 330. This processing is executed to exclude, from subsequent processing targets, a person who is near the watched person but is not a registered person, that is, not a person who can give support. After the person is registered as an unregistered person, the detection processing unit 203 excludes the same person as the unregistered person from detected people in subsequent person detection processing in step S502. This can prevent repetitive execution of processing in step S503 and subsequent steps for the unregistered person.

In step S506, the action determination unit 206 counts up the time. When the person detected to be present in the surrounding region is turned out to be a registered person, the action determination unit 206 starts time counting to measure the stay time of this registered person in the surrounding region. Subsequently in step S507, the action determination unit 206 determines whether the stay time of the registered person in the surrounding region becomes equal to or longer than a predetermined time. More specifically, the action determination unit 206 determines whether the count value by time counting is equal to or larger than a threshold corresponding to the predetermined time. If the count value is equal to or larger than the threshold ("YES" in step S507), the process advances to step S510. If the count value is smaller than the threshold ("NO" in step S507), the process advances to step S508.

In step S508, the action determination unit 206 determines whether the registered person present in the surrounding region has performed a predetermined support action. The predetermined support action includes, for example, an action (order acceptance action) of accepting an order from a customer by the restaurant staff serving as a registered person, and a predetermined gesture action. When the predetermined input terminal 500 is operated to input the order accepted from the customer, the order acceptance action includes an action of operating the input terminal 500. When the order is written down on the order sheet without using the input terminal 500, the order acceptance action can also include an action of writing down the order. These actions are generally performed by bending the arms and positioning at the center of the body the hand gripping the terminal or the order sheet. Hence, the action can be detected by detecting the bending angle of the arm of the restaurant staff. Since the terminal, the order sheet, or the writing tool is positioned in front of the body of the restaurant staff, the action may be detected by recognizing the shape of the terminal or the like positioned over the body of the restaurant staff. Information for determining whether these predetermined support actions have been done is registered in the determination information database 320. The action determination unit 206 can detect the action by referring to the determination information obtained from the determination information database 320.

The gesture action can include a predetermined body language, a hand movement, and a pose. If a gesture to be executed when the restaurant staff gives support is determined in advance, execution of the support action can be determined based on detection of this gesture. Information for determining whether the gesture has been executed is registered in the determination information database 320. By referring to the determination information obtained from the determination information database 320, the action determination unit 206 can determine whether the restaurant staff has executed the gesture.

When the restaurant staff operates the input terminal 500, a signal representing that the operation has been performed may be transmitted from the input terminal 500 to the information processing apparatus 200 via the LAN 600. In accordance with reception of the signal from the terminal regardless of image analysis processing, the action determination unit 206 can determine that the predetermined support action has been executed.

If it is determined that the predetermined support action has been executed ("YES" in step S508), the process advances to step S510. If it is not determined that the predetermined support action has been executed ("NO" in step S508), the process advances to step S509. In step S509, when the count value is smaller than the threshold and the predetermined support action has not been executed, the action determination unit 206 determines whether the registered person still stays in the surrounding region. If the registered person stays in the surrounding region, the process returns to step S506 to count up the time. If the person does not stay in the surrounding region, it can be determined that the entering registered person did not give support to the watched person and left the spot, so the process advances to step S511.

In step S510, it is determined that support for the watched person is completed, and the surrounding person analysis processing ends. In the case of a restaurant assumed in this embodiment, this processing is executed when it can be interpreted that the restaurant staff (registered person) arrived for support at a customer (watched person) requiring support of the restaurant staff, was confirmed to stay for a predetermined time or longer, and gave the support. This processing is also executed when execution of a predetermined support action by the restaurant staff was confirmed because it can be interpreted that the restaurant staff gave support. Then, the process advances to step S317 to determine that support is completed, and the support processing ends.

In step S511, it is determined that support for the watched person is uncompleted, and the surrounding person analysis processing ends. Thereafter, the process advances to step S317 to determine that support is uncompleted, and returns to step S311 to repeat the support processing.

Note that the series of processes is executed while always monitoring that the watched person stays in the monitoring target area 1 set as a criterion in step S302 and the like. If the watched person leaves the area, the process ends at that point. Although support incompletion determination is performed in step S511, the process may return to step S501 to continue monitoring the surrounding region. Further, the execution order of the determinations in steps S508 and S509 may be reversed or the determinations may be executed in parallel. It is also possible to omit the determination processing in step S508 and determine in step S509 only whether the registered person stays in the surrounding region. Alternatively, the processes in steps S508 and S509 may be performed prior to the processes in steps S506 and S507.

Figure 6A:
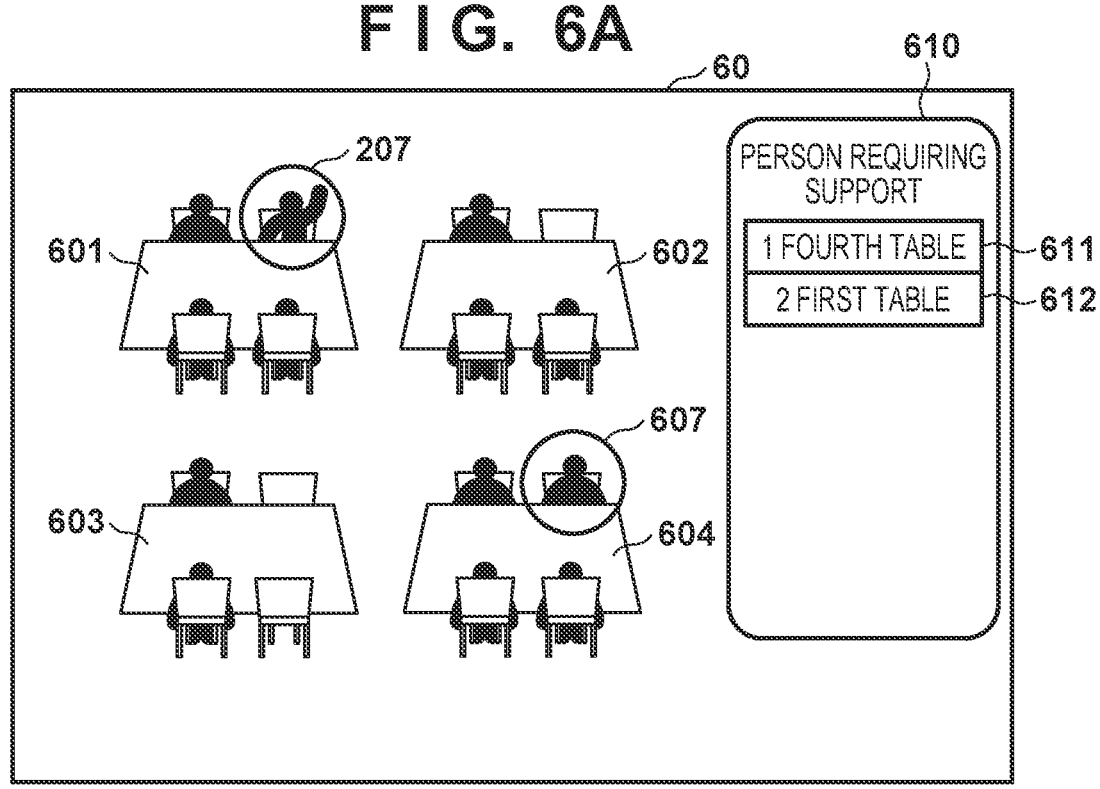
FIG. 6A is a view showing an example of a screen displayed on an information display device 400 according to the first embodiment.

Next, examples of the notification display on the information display device 400 will be explained with reference to FIGS. 6A and 6B. FIG. 6A shows an example of display using an image shot by the network camera 100. Tables 601 to 604 are displayed in a screen 60, and customers sit down at each table. In the example of FIG. 6A, the tables 601 to 604 will be called the first to fourth tables in the order named, and support-required marks 605 appear on a person of the fourth table 604 and a person of the first table 601. Information representing the position of a person requiring support is displayed in a message display region 610. In the example of FIG. 6A, frames 611 and 612 represent that people requiring support are present at the fourth table 604 and the first table 601 in the order of determined support requests. The restaurant staff who looks at the screen 60 can go for support preferentially to a person displayed at a higher position in the order of display in the message display region 610.

In FIG. 6A, corresponding colors may be assigned as the color of the frames 611 and 612 and the color of the support-required mark 605 superimposed on an image of each person. For example, when the support-required mark 605 displayed on the person of the fourth table 604 is red, the color of the frame 611 can also be red. Similarly, when the support-required mark 605 displayed on the person of the first table 601 is green, the color of the frame 612 can also be green. The correspondence between the color of the mark and the color of the frame enables quickly determining who should receive support more preferentially.

The display form of the support-required mark 605 may be switched to a blinking display upon the lapse of a predetermined time after the start of display. Further, the blinking speed may become higher as the elapsed time becomes longer. When the support-required mark 605 is newly displayed on the screen 60, the information display device 400 can output a predetermined sound to notify the surroundings that the new support-required mark 605 has been displayed.

Figure 6B:
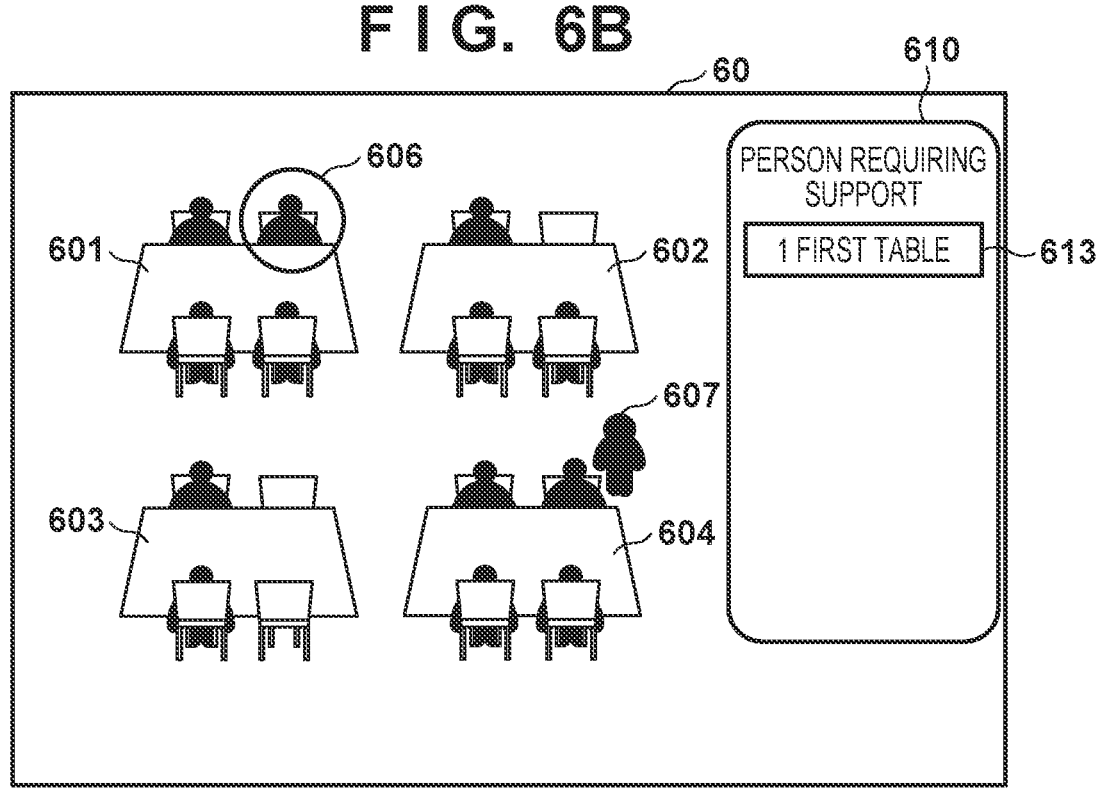
FIG. 6B is a view showing another example of a screen displayed on the information display device 400 according to the first embodiment.

Next, FIG. 6B shows an example of display after it is determined that restaurant staff 607 who saw the display in FIG. 6A gave support to the person of the fourth table 604. In FIG. 6B, the presence of the restaurant staff 607 was confirmed in the surrounding region of the person of the fourth table 604, it is determined that support was executed, and thus the display of the support-required mark 605 disappears from the person of the fourth table 604. Along with this, the display of the fourth table in the frame 611 disappears from the message display region 610, and only the first table is displayed in a frame 613.

As described above, it can be determined based on image analysis whether a person in an image shot by the network camera 100 requires support, and the outside is notified of the necessity of support for the person determined to require support, thus requiring support. For the person determined to require support, image analysis is further continued in association with this person, and it is determined continuously whether support was executed. For a person not requiring support, no further image analysis is performed. If execution of support is detected, further image analysis ends. Accordingly, image analysis is executed additionally only for a person requiring support, whereas additional image analysis can be omitted for a person not requiring support. This can implement efficient processing.

Second Embodiment

In the first embodiment, whether support is necessary is determined for every person included in image data. However, in a restaurant or the like, a plurality of people around one table can be regarded to form one group. In this case, it may be efficient to determine necessity of support for a group of people, instead of determining necessity of support for each person included in the group, and then determine whether support has been executed. In this embodiment, a case in which processing is executed for one group of people will be explained.

Figure 7A:
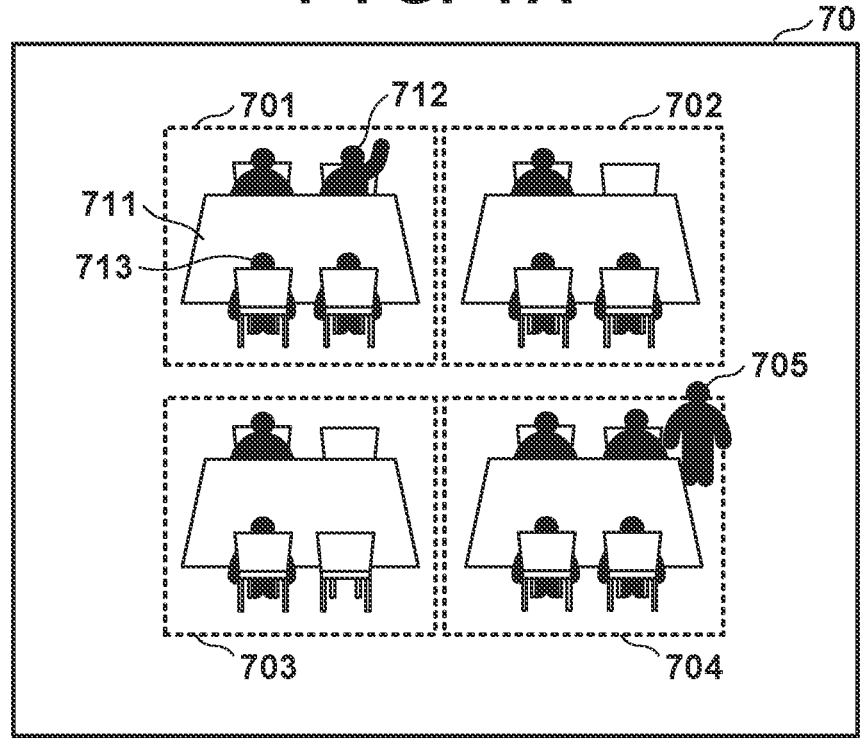
FIG. 7A is a view for explaining grouping of people according to the second embodiment.

FIG. 7A is a view exemplifying an image capturing a state inside a restaurant. An image 70 is an example of an image representing a state inside the restaurant captured by a network camera 100. This image is the same as that shown in FIG. 6A and the like. The image 70 represents four tables installed in the restaurant and people using each table. Regions 701 to 704 are set around the respective tables, and each region is indicated by a dotted line.

For example, in the region 701, four people sit down at a table 711, and a person 712 raises his/her hand and calls restaurant staff (clerk) 705. At this time, the person 712 is considered to be requesting, on behalf of the four people sitting down at the table 711, for support of the restaurant staff 705. When the restaurant staff 705 heads to the table 711 in response to the support request, it is obviously predicted that he/she will meet an order from not only the person 712 but also all the people at the table 711.

In such a case, whether support is necessary need not be determined for all people around the table 711, and if it can be determined for any person that support is necessary, the determination of necessity/unnecessity of support may be skipped for the remaining people. It suffices to determine whether support is completed, not for each person but for each table. For example, even if the person 712 raises his/her hand and calls the restaurant staff 705, a person 713 may be closest to the restaurant staff 705 when the restaurant staff 705 comes to the table 711 to take an order. Even in this case, whether support is completed is determined for each table, that is, in association with any person sitting down at the table. The necessity of support can be determined for each table (each group of people), and whether support is completed can be determined for each table (each group).

In this embodiment, an image is partitioned in advance into the predetermined regions 701 to 704, as represented by the image 70 in FIG. 7A, and whether any person included in a group requires support is determined for a group of people detected to be present in each region. When it is determined that any person included in the group requires support, determination for the remaining people is skipped. On the other hand, all people present in the region including the person determined to require support are regarded as watched people and surrounding person analysis processing is executed. When execution of support is confirmed for any person included in the group, the watched state ends for all the people included in the group including this person.

More specifically, in processing of FIG. 3A, person detection is performed for the respective regions 701 to 704. In this case, people sitting down on chairs are unlikely to be registered people, so person collation in step S305 may be omitted to execute support processing in step S307 immediately. Determination of whether a person is in the watched state is performed for each group in step S304. For example, as for four people sitting down at a given table, the determination result is that all of them are watched people or not.

In processing of FIG. 3B, behavior analysis is performed for all people detected in each of the regions 701 to 704, and all other people present in each region where a person determined to require support is detected are shifted to the watched state. Then, surrounding person analysis processing in step S316 is performed, and if support is determined to be completed in association with any person, the watched state of all the people in this region ends. In the surrounding person analysis processing in step S316, whether support is completed or uncompleted is determined in association with any person in the region.

Although FIG. 7A shows a case in which an image is partitioned into a plurality of predetermined regions for respective tables in a restaurant, the exemplary embodiment is not limited to this. For example, a plurality of people may be grouped based on the distance between people. In general, the distance between people acting together is shorter than that between people not acting together. From this, a predetermined distance is set in accordance with the type of facility provided with this system, and people whose interperson distance is shorter than the predetermined distance can be grouped. This grouping method is effective when tables as shown in FIG. 7A are not arranged and only people are present in a monitoring target area 1.

Figure 7B:
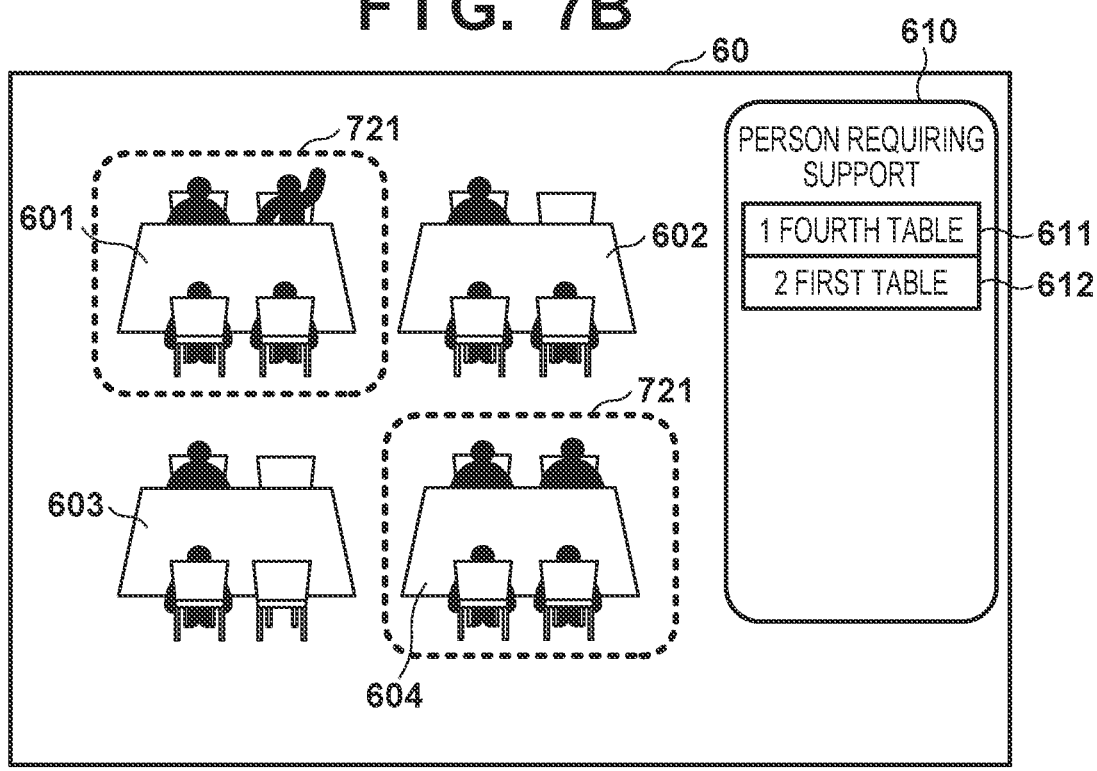
FIG. 7B is a view showing an example of a screen displayed on an information display device 400 according to the second embodiment.

Next, an example of a notification display on an information display device 400 according to this embodiment will be described with reference to FIG. 7B. FIG. 7B is view showing a modification of FIG. 6A according to this embodiment, and shows an example of display using an image shot by the network camera 100. In FIG. 7B, the reference numerals used in FIG. 6A are directly used for unchanged portions. In FIG. 6A, the support-required marks 605 appear on a person of the fourth table 604 and a person of the first table 601. However, in FIG. 7B according to this embodiment, support-required marks 721 appear not on each person but on each table (each group of people). The restaurant staff who looks at a screen 60 can quickly grasp a table (a group) to which he/she should go for support.

Even in the display form as shown in FIG. 7B, the color of frames 611 and 612 and the color of the support-required mark 721 may have a one-to-one correspondence. Blinking display and sound output can also be applied similarly to the first embodiment.

Processing to be performed for a group of people in the second embodiment can be executed in combination with processing to be performed for each person in the first embodiment. For example, the monitoring target area 1 may include a region having a table and a region having no table. In such a case, processing in the second embodiment is performed for the region having a table, and processing in the first embodiment is performed for the region having no table. When grouping is performed based on the distance between people, processing in the first embodiment can be performed for each person who cannot be grouped, and processing in the second embodiment can be performed for grouped people.

As described above, a plurality of people present in a predetermined region in an image can be grouped into one. While omitting processing, it can be avoided to continue the processing for a person for whom it is unnecessary to determine whether support is necessary.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-015503 filed on Jan. 31, 2018 which is hereby incorporated by reference herein in its entirety.

What is claimed is:

1. An information processing apparatus comprising a computer having a processor and a memory and executing instructions that, when executed by the computer, cause the computer to function as:
   a detection unit configured to analyze an input image and detect a person included in the input image;
   an action determination unit configured to determine whether the detected person has performed a first action for requesting support; and
   an output unit configured to output a notification about a first person determined by the action determination unit to have performed the first action,
   wherein the action determination unit determines whether a person included in a group of people detected by the detection unit has performed the first action, and
   wherein, in a case where the action determination unit determines that a person included in the group has performed the first action, the output unit outputs a notification about the group.

2. The apparatus according to claim 1, wherein the first action includes at least one of an action of looking around and an action of raising a hand.

3. The apparatus according to claim 1, wherein the detection unit detects presence of a second person in a surrounding region of the first person by further image analysis associated with the first person.

4. The apparatus according to claim 3, wherein the detection unit further detects whether a time in which the second person stays in the surrounding region is not shorter than a predetermined time.

5. The apparatus according to claim 4, wherein when the detection unit detects that the time in which the second person stays in the surrounding region is not shorter than the predetermined time, the output unit ends output of the notification about the first person.

6. The apparatus according to claim 3, wherein the detection unit further detects whether the second person has executed a second action for support in the surrounding region.

7. The apparatus according to claim 6, wherein when the detection unit receives, from a terminal of the second person, information representing that the terminal has been operated, the detection unit detects that the second action has been executed.

8. The apparatus according to claim 6, wherein when the detection unit detects that the second person has executed the second action, the output unit ends output of the notification about the first person.

9. The apparatus according to claim 3, wherein the second person is a person registered in advance.

10. The apparatus according to claim 1, wherein
    the instructions further cause the computer to function as a person determination unit configured to determine whether the detected person is a person registered in advance,
    wherein the action determination unit determines whether the person determined by the person determination unit not to be the person registered in advance has performed the first action, and
    the detection unit regards, as the first person, each of the people included in the group, and executes further image analysis associated with the first person.

11. The apparatus according to claim 1, wherein the group is formed by grouping people having an inter-person distance shorter than a predetermined distance among a plurality of people detected by the detection unit.

12. The apparatus according to claim 1, wherein the group is formed by grouping a plurality of people detected by the detection unit in a predetermined region in the input image.

13. The apparatus according to claim 1, wherein when the action determination unit detects the first action for a person included in the group, the action determination unit does not perform detection of the first action for a remaining person included in the group.

14. A system comprising an information processing apparatus, an image capturing apparatus and a display device:
    wherein the information processing apparatus comprising includes a computer having a processor and a memory and executing instructions that, when executed by the computer, cause the computer to function as:
       a detection unit configured to analyze an input image and detect a person included in the input image;
       an action determination unit configured to determine whether the detected person has performed a first action for requesting support; and
       an output unit configured to output to an external device a notification about a first person determined by the action determination unit to have performed the first action,
    wherein the action determination unit determines whether a person included in a group of people detected by the detection unit has performed the first action, and
    wherein, in a case where the action determination unit determines that a person included in the group has performed the first action, the output unit outputs a notification about the group to the external device,
    wherein the image capturing apparatus is configured to generate an image by capturing a monitoring target area, and input the image to the information processing apparatus, and
    wherein the display device is configured to receive and display information output by the output unit of the information processing apparatus.

15. A control method for an information processing apparatus, comprising:
    analyzing an input image to detect a person included in the input image;
    determining whether the detected person has performed a first action for requesting support; and
    outputting a notification about a first person determined to have performed the first action in the determining,
    wherein, in the determining, it is determined whether a person included in a group of detected people has performed the first action, and
    wherein, in a case where it is determined that the person included in the group has performed the first action in the determining, a notification about the group is outputted in the outputting.

16. A non-transitory computer-readable storage medium storing a program that, when executed by a processor of an information processing apparatus, causes a processor to perform:
    analyzing an input image to detect a person included in the input image;
    determining whether the detected person has performed a first action for requesting support; and
    outputting a notification about a first person determined to have performed the first action in the determining,
    wherein, in the determining, it is determined whether a person included in a group of detected people has performed the first action, and wherein, in a case where it is determined that a person included in the group has performed the first action in the determining, a notification about the group is outputted in the outputting.

\* \* \* \* \*